United States Patent [19]

Small et al.

[11] 3,751,277

[45] Aug. 7, 1973

[54] TABLET COATING PROCESS AND COMPOSITION

[75] Inventors: James E. Small, Sheridan, Ind.; Sampson F. Jeffries, Newport Beach, Calif.

[73] Assignee: The Dow Chemical Company, Midland, Mich.

[22] Filed: Mar. 24, 1971

[21] Appl. No.: 127,786

Related U.S. Application Data

[63] Continuation-in-part of Ser. No. 799,984, Feb. 17, 1969, abandoned.

[52] U.S. Cl. .................. 106/213, 424/35, 424/361
[51] Int. Cl. ............................................. C08b 27/22
[58] Field of Search ............................ 424/361, 35; 106/213

[56] References Cited
UNITED STATES PATENTS

| | | | |
|---|---|---|---|
| 3,619,292 | 11/1971 | Brouillard | 424/362 |
| 3,313,640 | 4/1967 | Bauer | 106/210 |
| 3,030,273 | 4/1962 | Zagnoli | 424/35 |
| 3,256,111 | 6/1966 | Singiser | 106/197 R |
| 3,456,050 | 7/1969 | Rieckmann | 424/35 |

*Primary Examiner*—Theodore Morris
*Attorney*—Griswold & Burdick

[57] ABSTRACT

A composition for coating tablets and other individual dosage forms comprising a sugar, hydrolyzed cereal solids, starch, a solid polyethylene glycol and a liquid polyhydroxy organic compound is disclosed. The composition can be employed to coat tablets by applying aqueous solutions thereof to the tablets and drying the solvent.

8 Claims, No Drawings

TABLET COATING PROCESS AND COMPOSITION

CROSS-REFERENCE TO RELATED APPLICATION

This is a continuation-in-part of our copending application, Ser. No. 799,984, filed Feb. 17, 1969, and now abandoned.

BACKGROUND OF THE INVENTION

Two major types of coating processes have found wide use in the coating of tablets and other solid dosage forms. Both sugar coating and film coating leave something to be desired. Sugar coating is time consuming and requires skilled, experienced operators for the application of visually suitable coatings. Sugar coatings are generally thick, with a high build-up of coating material on edges of tablets. Film coating, while usually more rapid than sugar coating, generally requires more expensive ingredients and employs organic solvents such as alcohols and halogenated hydrocarbons, the vapors of which must be removed from the tablet coating facility to prevent hazards to personnel and equipment. Some coatings mask embossing or score marks on tablets, make the tablets too tacky during drying, do not form a smooth, adherent coat on the tablets or are too soft and abrade away under the friction of the load in a drying pan. Still others react with or leach out physiologically-active ingredients from tablets, or involve solvents which pit or dissolve portions of the tablets.

There is a need for an inexpensive tablet coating composition which is usable with a wide variety of tablets and ingredients.

SUMMARY OF THE INVENTION

According to the present invention, there is now provided a tablet coating composition which is comprised of a sugar, a cereal solids hydrolysate, starch, a solid polyethylene glycol and a liquid polyhydroxy compound. Several other ingredients may be added to the previously-named ingredients in order to enchance the properties of the coating obtained from the composition. Among the more important of these additional materials are plasticizing agents of the humectant type, opaquing agents and coloring agents.

It is an object of the present invention to overcome the difficulties encountered in using the known coating compositions, and to provide an improved coating which is smooth, tough and resilient and which is not subject to rapidly destructive abrasion in the coating pan. It is a further object of the invention to provide a method for applying a coating composition employing an aqueous solvent and conventional equipment of the type employed with conventional film coating procedures. Another object of the invention is to provide a coating composition which provides a thin, tough, glossy coating similar in appearance to that obtained with film coating. Other objects and advantages of the invention will be apparent on consideration of the following description and claims.

The composition of the invention comprising sugar, hydrolyzed cereal solids (the cereal solids hydrolysate), starch, solid polyethylene glycol and liquid polyhydroxy compound provides excellent thin, tough, glossy coatings on a variety of tablets, which coatings neither abrade nor become sticky or tacky in storage, yet which are easily disintegrated in water or gastric fluids. The composition is soluble in water and can be rapidly applied with spraying or automated procedures to obtain coatings similar in appearance to film coatings.

The cereal solids hydrolysate employed in the composition and method of the invention can be a cereal starch hydrolysate (obtained from crop plants such as sorghum, milo, corn and the like) having a low dextrose equivalent (about 8 to about 20) and good water solubility, forming 50 percent solids by weight solutions in water. Such cereal solids hydrolysates are typically obtained by acid neutralization, purification and drying in accordance with conventional procedures, such as are described in The Chemistry and Technology of Cereals as Food and Feed, edited by Matz, Avi, Westport, Conn. (1959), pp. 378–382. Such cereal solids hydrolysates are typically referred to as "hydrolyzed cereal solids" or "maltodextrines".

Preferred cereal solids hydrolysate ingredients have a dextrose equivalent of from about 8 to about 20, and have on a dry weight basis from about 0.5 to about 2 percent dextrose, from about 4.5 to about 8.5 percent disaccharides, from about 5 to about 10 percent trisaccharides), from about 3.7 to about 6 percent tetrasaccharides, and from about 3.7 to about 5.5 percent pentasaccharides, the remainder of the hydrolysate being higher polysaccharides such as hexasaccharides, heptasaccharides, dextrins and the like. Dispersions or solutions of the preferred cereal solids hydrolysate ingredient in water typically have a pH of from about 4.5 to about 5.5, aqueous solutions thereof being clear and substantially colorless. Such hydrolysates of cereal solids can be obtained by treatment of cereal grains to obtain a carbohydrate having the above composition and characteristics, or different starch hydrolysates can be blended together with the addition of supplemental dextrose or particular polysaccharides to obtain a product of the desired composition and characteristics. Suitable cereal solids hydrolysate ingredients are commercially available as products of the Corn Industrial Division of CPC International, Inc. under the name MOR-REX. A preferred hydrolyzed cereal solids ingredient is a low dextrose equivalent starch hydrolysate such as that sold under the name MOR-REX Code 1918, having a dextrose equivalent of about 9 to about 13 and containing about 0.5 to 1 percent dextrose, about 4.5 to 5 percent disaccharides, about 4.75 to 5.5 percent trisaccharides and about 3.75 to 4.5 percent each of tetrasaccharides and pentasaccharides. For the sake of convenience, the cereal solids hydrolysate will be referred to as "HCS" (for hydrolyzed cereal solids) in the present specification. Particular HCS compositions will be characterized by typical data employed in the trade, e.g., approximate dextrose equivalent and approximate content of dextrose, di-, tri-, tetra-, and penta-saccharides and higher saccharides. Such data is generally sufficient to characterize the HCS ingredient for the purposes of the present invention.

The pregelatinized starch employed in the method and composition of the invention is a pregelatinized starch of high solubility in cold water, generally in excess of 90 percent on a solids basis; of slightly acid pH, aqueous solutions containing such pregelatinized starch having a pH of from about 5 to about 6; and of fine particle size, from about 90 to 95 percent or more of the material passing a screen having 100 meshes to the inch. The starch material should be of high purity, preferably containing less than about 10 to 20 parts per million of solid impurities. A pregelatinized corn starch of USP grade is preferred.

The liquid polyhydroxy compound employed in the present process and composition can be glycerol or glycerin, propylene glycol or a lower polyethylene glycol having a pour point below about 85° F. Representative liquid glycol ingredients thus include propylene glycol USP, glycerine USP, di-, tri- and tetraethylene glycols and mixtures of polyethylene glycols having an average molecular weight from about 106 to about 600. Preferred liquid glycols are glycerine and propylene glycol.

The solid polyethylene glycol ingredient of the present invention is a polyethylene glycol or mixture of polyethylene glycols having an average molecular weight of from about 5,500 to about 8,000, preferably from about 6,000 to about 7,500. Such polyethylene glycols are typically designated by a number which designates the average molecular weight thereof, e.g., polyethylene glycol 7000 is a mixture of polyethylene glycols having an average molecular weight of about 7,000. Such solid polyethylene glycols are waxy solids at room temperatures, having freezing points higher than 50°C., and are herein referred to as "solid" polyethylene glycols in distinction from the liquid glycols employed in the present invention.

The sugar employed in the composition and method of the invention is a disaccharide selected from sucrose and lactose. Sucrose USP or lactose USP are preferred. When sucrose is employed as the sugar, excellent coatings are obtained with reductions of as much as about 50 percent in the total amount of sugar ingredient required when lactose is employed, and sucrose USP is the sugar ingredient of choice.

The liquid polyhydroxy compound employed in the present process and composition can be glycerol or glycerin, propylene glycol or a lower polyethylene glycol having a pour point below about 85° F. Representative liquid glycol ingredients thus include propylene glycol USP, glycerine USP, di-, tri- and tetraethylene glycols and mixtures of polyethylene glycols having an average molecular weight from about 106 to about 600. Preferred liquid glycols are glycerine and propylene glycol.

The solid polyethylene glycol ingredient of the present invention is a polyethylene glycol or mixture of polyethylene glycols having an average molecular weight of from about 5,500 to about 8,000, preferably from about 6,000 to about 7,500. Such polyethylene glycols are typically designated by a number which designates the average molecular weight thereof, e.g., polyethylene glycol 7000 is a mixture of polyethylene glycols having an average molecular weight of about 7,000. Such solid polyethylene glycols are waxy solids at room temperatures, having freezing points higher than 50° C., and are herein referred to as "solid" polyethylene glycols in distinction from the liquid glycols employed in the present invention.

The sugar employed in the composition and method of the invention is a disaccharide selected from sucrose and lactose. Sucrose USP or lactose USP are preferred. When sucrose is employed as the sugar, excellent coatings are obtained with reductions of as much as about 50 percent in the total amount of sugar ingredient required when lactose is employed, and sucrose USP is the sugar ingredient of choice.

The coating composition employed in the present invention includes, as the essential solid film-forming ingredients thereof, from about 8 to about 25 percent by weight of the sugar ingredient, from about 15 to about 40 percent by weight of the HCS composition, from about 25 to about 55 percent by weight of the pregelatinized starch, from about 7 to about 22 percent by weight of the solid polyethylene glycol ingredient and from about 3 to about 8 percent by weight of the liquid polyhydroxy compound. The relative ratios of the four solid ingredients to each other and to the liquid glycol ingredient can be varied provided that the ultimate percentages of each ingredient in the coating composition remain within the above ranges. The use of too little of the sugar ingredient or of too much of the HCS ingredient, such as 50 to 75 percent, or the elimination of the sugar ingredient with simultaneous increase in the HCS ingredient all produce a coating which is brittle and which cracks when dried. The use of too little starch, such as 10 to 15, to 20 percent, or of too much solid polyethylene glycol, such as 25 percent or more, results in a soft coating, with the coating wearing off the tablet edges as the tablets are tumbled in a coating pan. In addition, when the composition contains excess polyethylene glycol, the coating becomes tacky and soft at high temperatures. When excess sugar, such as 30–35 percent, or insufficient HCS is employed, the resulting coating is dull and lacks a desirable glossy luster.

Optimum results are obtained when the five components are employed in amounts of about 3 to about 6 parts by weight of the sugar, from about 6 to about 10 parts by weight of the hydrolyzed cereal solids, from about 10 to about 14 parts by weight of the pregelatinized starch, from about 3 to about 5 parts by weight of the solid polyethylene glycol and from about 1.25 to about 1.75 parts by volume of the liquid polyhydroxy compound (about 1.3 to about 2.2 parts by weight depending upon the exact polyhydroxy compound employed).

The coating compositions can also include conventional coating modifiers such as artificial colors and flavors and color extenders such as titanium dioxide. Minor amounts of plasticizers of the humectant-type such as acetylated glycerides or polyvinyl pyrrolidone can also be employed and are greatly preferred over the water-insoluble plasticizers such as diethyl phthalate and castor oil. The selection and use of particular coating modifiers to obtain tablet coatings with the desired hue and intensity of color can be carried out by known procedures such as the preparation of various range-finding coating operations. Excellent coatings can be obtained without the use of any additional coatings modifiers, and when F. D. and C. or D. and C. colors or lakes, humectant-type plasticizers or color extenders and the like are employed, such coating modifiers typically comprise no more than a few percent of the finished coat.

Among the coloring agents which may be used in the practice of this invention are any of the non-toxic dyes, lakes and pigments which can be dissolved in, or otherwise dispersed in, the aqueous solvent employed in the coating composition, and which have been certified for use in the food, drug and cosmetic industries as D. and C., or F. D. and C. colorants. For example, dyes of the type represented by F. D. and C. red No. 3, F. D. and C. green No. 2, F. D. and C. yellow No. 5, F. D. and C.

violet No. 1, D. and C. red No. 35, D. and C. orange No. 17, F. D. and C. blue No. 1 and D. and C. green No. 6 are suitable for use as colorants in the coating composition.

Many lakes are suitable in the practice of this invention. A lake is a dye which has been precipitated on an insoluble metal compound. To meet Food and Drug Administration requirements, it is necessary to deposit one of the acceptable dyes on a pharmaceutically-acceptable carrier such as aluminum hydroxide. As an example, F. D. and C. red No. 3 may be deposited on aluminum hydroxide.

Even when the coating composition claimed herein is applied without coloring agent, a tablet of pleasing appearance is obtained having a colorless coating. An opaque coating may be obtained by the addition of a quantity of titanium dioxide to the composition, if desired, as by triturating or milling the requisite amount with the coating composition. Examples of other opaquing agents are calcium carbonate, precipitated, USP and kaolin NF.

The invention is most highly suitable, however, to the application of colored film-like coatings in which a small quantity of a suitable coloring agent such as the dyes, pigments and lakes previously set forth, or a mixture thereof with an opaquing agent, is incorporated into the solution prior to application on the tablets. In this manner, a highly pleasing appearance is given to the tablets and the tablets may be regarded as "elegant" in the terms of the trade. The coating of this invention very effectively coats the tablets so that no unpleasant taste can be perceived, but at the same time, distinctive markings punched into the tablet core will show through very clearly and be readily discernible on the surface.

In carrying out the process of the present invention, the coating composition is conveniently first prepared as an aqueous solution. The concentrations of the sugar, HCS, starch, solid polyethylene glycol and liquid polyhydroxy compound can vary considerably in the solution, provided that all of the five ingredients are dissolved therein and provided that the proportions of the five ingredients relative to each other remain within the above-stated ranges. The amount of coating composition comprising the five ingredients can vary from about 10 or lower percent (weight/volume) to about 50 percent or more (weight/volume) of the aqueous solution. Generally, however, the solution should contain from about 20 to about 40 percent (weight/volume) of the coating composition in the aqueous solution, since solutions appreciably more concentrated than those set forth above tend to be quite viscous and thus difficult to apply, while substantially more dilute solutions are of greatly diminished value in building up a coating on tablets at an appreciable rate. The expression "weight/volume" means weight per volume, i.e., the weight in grams of composition per 100 milliliters of suspension or solution.

The coating solutions are conveniently prepared by mixing the ingredients together with water in any desired order or fashion. In a preferred procedure, the sugar, HCS, starch, liquid polyhydroxy compound and any coating modifiers such as colors or color extenders are mixed with a small amount of the water and the solid polyethylene glycol is then dissolved in the resulting solution. Additional water is the added to obtain a solution of desired viscosity.

In the method of the invention, the aqueous solution of coating composition ingredients is applied to the tablets in a manner suitable for coating the same. The composition is typically applied by spraying the solution more-or-less continuously onto a moving bed of tablets in a rotating coating pan, although the solution can also be applied by slowly pouring successive small batches of solution onto the tablet bed or by employing a fluidized bed coating apparatus in which the bed of tablets is moved by an air stream. The coating solution can be applied over a wide range of temperatures, generally higher temperatures favoring more rapid evaporation of the aqueous solvent. In a preferred procedure, the coating solution is heated at a temperature of from about 30°C. to about 50°C. and sprayed on the tablets. It is further preferred that a stream of heated dry air be directed into the coating pan to facilitate evaporation of the water and removal of water vapor. The fineness of the spray and the temperatures, air flow, etc. can be easily selected so that the composition is applied to the tablets as a liquid, and thereafter, evaporates rapidly to form a finished dry coating. Typically, the application rate can vary widely depending upon tablet size and composition, the number of coats applied, the concentration of ingredients in the coating solution, the temperatures and the like. If desired, the coated tablets can be allowed to dry for an additional period of a few hours after cessation of spraying to ensure removal of all the aqueous solvent. The dried coated tablets can be packaged directly, or they can be coated with additional coats of the composition, or they can be polished and waxed with substances such as caranuba, beeswax or paraffin waxes.

The finished dry coating on the tablet contains from about 8 to about 25 percent by weight of sugar, from about 15 to about 40 percent by weight of the HCS composition, from about 25 to about 55 percent by weight of the pregelatinized starch, from about 7 to about 22 percent by weight of the solid polyethylene glycol and from about 3 to about 8 percent by weight of the liquid polyhydroxy compound as the essential coating ingredients. The percent by weight of coating modifiers such as colorants is quite small and usually does not exceed several percent by weight in total amount.

DESCRIPTION OF THE PREFERRED EMBODIMENTS

The following examples are illustrative of the invention but are not to be construed as limiting the same.

EXAMPLE 1

A tablet coating solution is made up according to the following formula:

| | | |
|---|---|---|
| Water | milliliters | 60 |
| Sucrose USP | grams | 4 |
| HCS | grams | 8 |
| Approximate Composition in Percent | | (MOR-REX Code 1918) |
| Dextrose 0.7 | | |
| Disaccharide 4.6 | | |
| Trisaccharide 5.2 | | |
| Tetrasaccharide 4.2 | | |
| Pentasaccharide 4.1 | | |
| Higher saccharides 81.2 | | |
| Dextrose equivalent between 10 and 13 | | |
| Pregelatinized starch | grams | 12 |
| Red coating shade (mixture of F. D. and C. colors) | grams | 0.08 |
| Titanium dioxide USP | grams | 0.4 |
| Propylene glycol USP | milliliters | 1.6 |

The above ingredients are intimately mixed together to dissolve the sucrose, HCS, starch, propylene glycol and color in the water. Four grams of solid polyethylene glycol (Carbowax 6000) are then added and mixed well. Water is added to make a mixture having a final volume of 100 milliliters and the mixture is stirred with a propeller-type stirrer to completely disperse the insoluble titanium dioxide throughout the solution of the other ingredients.

About 200 milliliters of the coating solution are employed to coat 500 grams of tablets. The tablets coated are prepared from a starch, milk sugar and sucrose base, with gelatin and gum acacia binder and with talc and magnesium stearate as lubricants. The tablets are compressed in a three-eights inch die and have an average weight of about 0.35 gram each.

The coating solution is applied to a moving bed of the tablets in a conventional rotating coating pan by spraying the solution onto the tablets using a conventional air pressure-operated spray gun while a stream of warm dry air is directed onto the moving bed of tablets to facilitate evaporation of water therefrom. After about 2.5 hours, the tablets are removed from the coating pan and dried on a tray for an additional 4 hour period at a temperature of 40°C. to assure complete drying of the coating.

Visual inspection of the tablets when removed from the coating pan and during and after the final drying period shows that the coating has a good gloss and is smoothly applied to all surfaces of the tablets without heavy build-up at the edges. The coating is not abraded or worn away at the tablet edges, nor does the coating crack or peel or become soft or tacky during drying.

Tablets coated in this manner have good gloss and a pleasing appearance and do not become tacky when stored for substantial periods of time at 55°C. or at 45°C., with a relative humidity of 80 percent. Disintegation tests carried out on the tablets show that the coating thereon disintegrates in a short time in either water or artificial gastric fluid. Each tablet has about 25 milligrams of coating which is somewhat similar in appearance to a thin film coating.

EXAMPLE 2

In a procedure similar to that of Example 1, 4,200 milliliters of tablet coating composition are applied to 22 pounds of 0.5 gram tablets as a moving bed in a tablet coating pan. The coating composition is applied as an intermittant spray from a hydraulic spray gun to provide several coats. The operation of the spray gun, warm air stream and coating pan are controlled by an automatic timer. The coated tablets are dried for 3.5 hours at 45°C. after the coating step is complete. The tablets have high gloss, are pleasing in appearance and show no evidence of chipping or abrading of parts of the coating.

EXAMPLE 3

In a procedure similar to that of Example 1, a coating composition is applied to tablets of various types. The composition is prepared as follows:

| | | |
|---|---|---|
| Water | Milliliters | 60 |
| Lactose USP | grams | 4.5 |
| HCS | grams | 6 |
| Approximate Composition in Percent | (MOR-REX Code P913) | |
| Dextrose | 1.7 | |
| Disaccharide | 8.1 | |
| Trisaccharide | 9.8 | |
| Tetrasaccharide | 5.7 | |
| Pentasaccharide | 5.2 | |
| Higher saccharides | 69.4 | |
| Dextrose equivalent between 16 and 20 | | |
| Pregelatinized starch | grams | 10 |
| F. D. and C. blue No. 1 | grams | 0.03 |
| F. D. and C. yellow No. 5 | grams | 0.03 |
| Titanium dioxide | grams | 0.3 |
| Propylene glycol USP | milliliters | 1.25 |

The above ingredients are mixed together, 3 grams of solid polyethylene glycol (Carbowax 6000) are added with stirring and water is added to a final volume of 100 milliliters.

The coating solution is applied to a moving bed of 1,000 grams of 0.4 gram tablets in a conventional coating pan. The solution is sprayed onto the tablets intermittently using a conventional air pressure-operated spray gun. The initial spray coating is applied until the tablets are completely coated, after which the tablets are tumbled in the coating pan until the initial coat appears dry, at which time a second coat is applied, such intermittent spray coating being continued until about 475 milliliters of coating composition have been applied. A stream of warm dry air is directed onto the moving bed of tablets to facilitate evaporation of water therefrom After about 3 hours from the beginning of the spray application, the tablets are removed from the coating pan and dried on a tray for an additional 4 hour period at a temperature of 40°C. to ensure complete drying of the coat.

Visual inspection of the tablets in the coating pan and during and after the final drying period shows that the coating has a pleasing appearance. The coating is not abraded or worn away at the tablet edges, nor does the coating crack or peel or become soft or tacky during drying. Disintegration tests carried out on the tablets show that the coating thereon disintegrates in a short time in either water or artificial gastric fluid.

EXAMPLE 4

A coating composition is prepared in a procedure similar to that described above and containing the following:

| | | |
|---|---|---|
| Water | milliliters | 60 |
| Lactose USP | grams | 6 |
| HCS | grams | 8 |
| Approximate Composition in Percent | (MOR-REX Code 1918) | |
| Dextrose | 0.7 | |
| Disaccharide | 4.6 | |
| Trisaccharide | 5.2 | |
| Tetrasaccharide | 4.2 | |
| Pentasaccharide | 4.1 | |
| Higher saccharides | 81.2 | |
| Dextrose equivalent between 10 and 13 | | |
| Pregelatinized starch | grams | 12 |
| Red coating shade (mixture of F. D. and C. colors) | grams | 0.08 |
| Titanium dioxide USP | grams | 0.4 |
| Propylene glycol USP | milliliters | 1.6 |
| Carbowax 6000 | grams | 4 |
| Water q.x. | milliliters | 100 |

A moving bed of about two pounds of 0.35 gram tablets is coated with about 450 milliliters of the above composition. The composition is applied in several successive coats by spraying the composition onto the tablets while warm dry air is directed onto the tablets. After additional drying for about 3 hours, the tablets are found to be pleasing in appearance, the coating is smooth and glossy and the edges of the tablets are fully coated. Further, disintegration tests carried out on the so-coated tablets show that the coating thereon disintegrates in a short time either in water or in artificial gastric fluid.

In other operations, similar results are obtained employing coating compositions identical with those described above with the following exceptions: (a) substitution of 1.75 milliliters of glycerin USP for the propylene glycol; (b) substitution of 3 grams of Polyglycol E-6000 for the Carbowax 6000; (c) substitution of polyethylene glycol 200 for the propylene glycol; (d) elimination of the color; or (e) elimination of the color and the titanium dioxide.

The method and composition are of particular advantage in coating tablets prepared with binders such as ethyl cellulose which are highly soluble in organic solvents, and for tablets containing active ingredients which are reactive with or which are leached out by organic solvents such as lower alcohols and halogenated hydrocarbons employed in synthetic film coating procedures.

What is claimed is:

1. A composition adapted for application to tablets and the like as a coating, the composition consisting essentially of, as the sole essential film-forming ingredients thereof, from about 8 to about 25 percent by weight of a sugar selected from the group consisting of sucrose and lactose; from about 25 to about 55 percent by weight of pregelatinized starch; from about 7 to about 22 percent by weight of a solid, water-soluble polyethylene glycol having a molecular weight of from about 5,500 to about 8,000; from about 3 to about 8 percent by weight of a liquid polyhydroxy compound selected from the group consisting of propylene glycol, glycerin and a lower polyethylene glycol having a pour point below about 85°F.; and from about 15 to about 40 percent by weight of water-soluble cereal starch solids hydrolysate having a dextrose equivalent of from about 8 to about 20; said hydrolysate having a dextrose content of from about 0.5 to about 2 percent, a dissacharide content of from about 4.5 to about 8.5 percent, a trisaccharide content of from about 5 to about 10 percent, a tetrasaccharide content of from about 3.7 to about 6 percent, and a pentasaccharide content of from about 3.7 to about 5.5 percent; said hydrolysate being sufficiently water-soluble to form a 50 percent solids by weight solution in water; and said hydrolysate being further characterized in that aqueous solutions thereof have a pH of from about 4.5 to about 5.5.

2. The composition of claim 1 wherein the sugar is sucrose.

3. The composition of claim 1 wherein the polyhydroxy compound is propylene glycol.

4. The composition of claim 1 wherein the solid polyethylene glycol has a molecular weight of from about 6,000 to about 7,500.

5. The composition of claim 1 wherein the cereal starch solids hydrolysate has a dextrose equivalent of from about 10 to about 13 and contains from about 0.5 to about 1 percent dextrose, from about 4.5 to about 5 percent disaccharides, from about 4.75 to about 5.5 percent trisaccharides and from about 3.75 to about 4.5 percent each of tetrasaccharides and pentasaccharides.

6. A coated tablet having as the coating material a thin film consisting of about 8 to about 25 percent by weight of a sugar selected from the group consisting of sucrose and lactose; from about 25 to about 55 percent by weight of pregelatinized starch; from about 7 to about 22 percent by weight of a solid, water-soluble polyethylene glycol having a molecular weight of from about 5,500 to about 8,000; from about 3 to about 8 percent by weight of a liquid polyhydroxy compound selected from the group consisting of propylene glycol, glycerin and a lower polyethylene glycol having a pour point below about 85°F.; and from about 15 to about 40 percent by weight of a cereal starch solids hydrolysate having a dextrose equivalent of from about 8 to about 20 and containing from about 0.5 to about 2 percent dextrose, from about 4.5 to about 8.5 percent disaccharides, from about 5 to about 10 percent trisaccharides, from about 3.7 to about 6 percent tetrasaccharides and from about 3.7 to about 5.5 percent pentasaccharides, said hydrolysate being sufficiently water-soluble to form a 50 percent solids by weight solution in water; and said hydrolysate being further characterized in that aqueous solutions thereof have a pH of from about 4.5 to about 5.5, as the sole essential film-forming ingredients.

7. The coated tablet of claim 6 wherein the sugar is sucrose, wherein the solid polyethylene glycol has a molecular weight of from about 6,000 to about 7,500, wherein the polyhydroxy compound is propylene glycol and wherein the cereal starch solids hydrolysate has a dextrose equivalent of from about 10 to 13 and contains from about 0.5 to about 1 percent dextrose, from about 4.5 to about 5 percent disaccharides, from about 4.75 to about 5.5 percent trisaccharides and from about 3.75 to about 4.5 percent each of tetrasaccharides and pentasaccharides.

8. The method of coating tablets and the like which comprises applying to said tablets a coating composition consisting essentially of about 8 to about 25 percent by weight of a sugar selected from the group consisting of sucrose and lactose; from about 25 to about 55 percent by weight of pregelatinized starch; from about 7 to about 22 percent by weight of a solid, water-soluble polyethylene glycol having a molecular weight of from about 5,500 to about 8,000; from about 3 to about 8 percent by weight of a liquid polyhydroxy compound selected from the group consisting of propylene glycol, glycerin and a lower polyethylene glycol having a pour point below about 85°F.; and from about 15 to about 40 percent by weight of a water soluble cereal starch solids hydrolysate having a dextrose equivalent of from about 8 to about 20 and containing from about 0.5 to about 2 percent dextrose, from about 4.5 to about 8.5 percent disaccharides, from about 5 to about 10 percent trisaccharides, from about 3.7 to about 6 percent tetrasaccharides and from about 3.7 to about 5.5 percent pentasaccharides; said hydrolysate being sufficiently water-soluble to form a 50 percent solids by weight solution in water; and said hydrolysate being further characterized in that aqueous solutions thereof have a pH of from about 4.5 to about 5.5; the coating composition being applied in the form of a solution thereof in an aqueous solvent, the solution containing from about 10 to about 50 percent (weight/volume) of the coating composition.

* * * * *